United States Patent [19]
Wyss et al.

[11] Patent Number: 5,705,083
[45] Date of Patent: Jan. 6, 1998

[54] STABILIZING LEATHER AGAINST THERMAL AND PHOTOCHEMICAL DECOMPOSITION

[75] Inventors: Franz Wyss, Riehen; Vladimir Arnold; Helena Dbaly, both of Basel; Gisbert Leuschner, Bottmingen; Manfred Rembold, Pfeffingen; Alois Püntener, Rheinfelden, all of Switzerland

[73] Assignee: Ciba Specialty Chemicals Corporation, Tarrytown, N.Y.

[21] Appl. No.: 662,735

[22] Filed: Jun. 10, 1996

Related U.S. Application Data

[63] Continuation of Ser. No. 371,639, Jan. 12, 1995, abandoned.

[30] Foreign Application Priority Data

Jan. 19, 1994 [CH] Switzerland .................... 160/94

[51] Int. Cl.$^6$ .................... C14C 9/02; C14C 11/00
[52] U.S. Cl. .................... 252/8.57; 106/287.23; 106/287.3; 106/243; 428/473
[58] Field of Search .................... 252/8.57; 428/473; 106/243, 287.23, 287.3; 427/389

[56] References Cited

U.S. PATENT DOCUMENTS

| | | | |
|---|---|---|---|
| 3,668,124 | 6/1972 | Cassella, Jr. | 252/8.57 |
| 4,285,689 | 8/1981 | Siegler | 252/8.57 |
| 4,295,976 | 10/1981 | Dessaint et al. | 252/8.57 |
| 4,572,721 | 2/1986 | Danner | 252/8.57 |
| 5,374,362 | 12/1994 | McFarland | 252/8.6 |

FOREIGN PATENT DOCUMENTS

| | | | |
|---|---|---|---|
| 2258453 | 8/1975 | France | 252/8.57 |
| 1255837 | 12/1967 | Germany | 252/8.57 |

*Primary Examiner*—Anthony Green
*Attorney, Agent, or Firm*—Kevin T. Mansfield; Michele A. Kovaleski

[57] ABSTRACT

Water-emulsifiable or -dispersible physical forms of sterically hindered mines, UV absorbers and antioxidants and their use for thermal and photochemical stabilization of materials of plastics, textile coatings, imitation leather and leather are described. The physical forms comprise a) a sterically hindered amine,
b) a UV absorber and/or
c) an antioxidant and
d) if appropriate, water and other additives.

32 Claims, No Drawings

STABILIZING LEATHER AGAINST THERMAL AND PHOTOCHEMICAL DECOMPOSITION

This is a Continuation of application Ser. No. 08/371,639 filed Jan. 12, 1995 now abandoned.

The present invention relates to a process for improving the resistance of leather and imitation leather to the influence of light and/or heat by treating these substrates with aqueous liquors comprising a sterically hindered amine, a UV absorber and/or an antioxidant. The present invention also relates to aqueous liquors used for carrying out these processes and water-emulsifiable or dispersible physical forms of sterically hindered amines, UV absorbers and antioxidants which are suitable for the preparation of these aqueous liquors.

Sterically hindered mines are often employed for photochemical stabilization of various materials, in particular synthetic polymers. For this, these mines are usually incorporated into the polymers, which may be molten, for example by mixing, grinding, kneading and the like.

It is also already known to apply water-insoluble sterically hindered mines to synthetic polymers, for example polypropylene fibres or imitation leather based on polyurethane/polyamide, from an aqueous liquor in the presence of dispersants and/or emulsifiers. The sterically hindered mines are employed for this purpose, for example, as the physical form comprising the mine, dispersant and/or emulsifier, and if appropriate water. However, the known physical forms are not able to meet all the requirements imposed, and in particular all the requirements of the leather-processing industry cannot yet be satisfied by stabilizing leather using these physical forms.

Novel physical forms having improved properties when used in an aqueous liquor have now been found, which have the particular feature of an excellent emulsifiability or dispersibility, can be incorporated into aqueous latices or liquors without problems and are outstandingly suitable for stabilizing leather against thermal and photochemical decomposition.

The present invention therefore relates to a process for improving the resistance of leather and imitation leather to the influence of light and/or heat, which comprises treating these substrates with an aqueous emulsion or dispersion comprising an emulsifier or dispersant and a) a water-insoluble sterically hindered amine,
b) a water-insoluble UV absorber and/or
c) a water-insoluble antioxidant and
d) if appropriate, further additives.

An outstanding protection against thermal and photochemical decomposition is achieved by the combined use of sterically hindered amine, UV absorber and/or antioxidant. The substrate to be treated can be treated successively in any sequence with in each case an aqueous liquor comprising a sterically hindered amine, a UV absorber and an antioxidant, but these agents are preferably contained in a single treatment liquor.

Preferred processes according to the invention comprise treating the substrates with an aqueous emulsion comprising an emulsifier and a) a water-insoluble sterically hindered amine,
b) a water-insoluble UV absorber and/or
c) a water-insoluble antioxidant and
d) if appropriate further additives.

The present invention furthermore relates to aqueous liquors for carrying out the processes according to the invention, which comprise water, an emulsifier or dispersant and a) a water-insoluble sterically hindered amine,
b) a water-insoluble UV absorber and/or
c) a water-insoluble antioxidant and
d) if appropriate further additives.

Aqueous liquors which are preferably used comprise an emulsifier and a) a water-insoluble sterically hindered amine,
b) a water-insoluble UV absorber and/or
c) a water-insoluble antioxidant and
d) if appropriate further additives.

The present invention furthermore relates to physical forms of sterically hindered amines, UV absorbers and antioxidants which are suitable for preparation of the aqueous liquors.

The novel physical forms of sterically hindered amines comprise a) a water-insoluble sterically hindered mine,
b) a polyalcohol which is completely or partly esterified with a fatty acid,
c) a reaction product of a polyalcohol, which is completely or partly esterified with a fatty acid, and an alkylene oxide and
d) if appropriate, water and other additives.

The physical forms according to the invention of UV absorbers comprise a) a water-insoluble UV absorber,
b) a polyalcohol which is completely or partly esterified with a fatty acid,
c) a reaction product of a polyalcohol, which is completely or partly esterified with a fatty acid, and an alkylene oxide and
d) if appropriate, water and other additives.

The physical forms according to the invention of antioxidants comprise a) a water-insoluble antioxidant,
b) a polyalcohol which is completely or partly esterified with a fatty acid,
c) a reaction product of a polyalcohol, which is completely or partly esterified with a fatty acid, and an alkylene oxide and
d) if appropriate, water and other additives.

These physical forms can in each case be introduced individually into water and the leather or imitation leather can be treated with the resulting liquors. However, the sterically hindered amine, UV absorber and/or antioxidant can also be combined in a single physical form.

The present invention furthermore relates to physical forms comprising sterically hindered amines and UV absorbers and/or antioxidants which are suitable for preparation of the aqueous liquors.

Such physical forms according to the invention comprise a) a water-insoluble sterically hindered amine,
   a1) a water-insoluble UV absorber and/or
   a2) a water-insoluble antioxidant,
b) a polyalcohol which is completely or partly esterified with a fatty acid,
c) a reaction product of a polyalcohol, which is completely or partly esterified with a fatty acid, and an alkylene oxide and
d) if appropriate, water and other additives.

A preferred sterically hindered amine which is used according to the invention is a compound which contains at least one group of the formula I

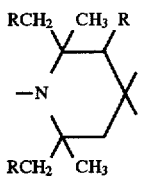

in which R is hydrogen or methyl.

Such sterically hindered amines can be of low molecular weight (MW<700) or higher molecular weight (oligomers, polymers). Preferably, these groups carry one or two polar substituents in the 4-position, or a polar spiro ring system is bonded to the 4-position.

Compounds which are of particular interest are a) sterically hindered amines of the formula II

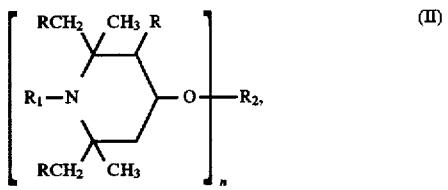

in which n is a number from 1 to 4, preferably 1 or 2,
R is hydrogen or methyl, $R_1$ is hydrogen, hydroxyl, $C_1-C_{12}$alkyl, $C_3-C_8$alkenyl, $C_3-C_8$alkenyl, $C_7-C_{12}$aralkyl, $C_1-C_8$alkanoyl, $C_3-C_5$alkenoyl, glycidyl, —O—$C_1-C_{12}$alkyl, —O—$C_1-C_8$alkanoyl or a group —$CH_2CH(OH)$—Z, in which Z is hydrogen, methyl or phenyl, and in which $R_1$ is preferably hydrogen, $C_1-C_4$alkyl, allyl, benzyl, acetyl or acryloyl and $R_2$, if n is 1, is hydrogen, $C_1-C_{18}$alkyl, which may be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid, or a monovalent silyl radical, preferably a radical of an aliphatic carboxylic acid having 2 to 18 C atoms, of a cycloaliphatic carboxylic acid having 7 to 15 C atoms, of an α,β-unsaturated carboxylic acid having 3 to 5 C atoms or of an aromatic carboxylic acid having 7 to 15 C atoms, or, if n is 2, is $C_1-C_{12}$alkylene, $C_4-C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 C atoms, of a cycloaliphatic or aromatic dicarboxylic acid having 8–14 C atoms or of an aliphatic, cycloaliphatic or aromatic dicarbamic acid having 8–14 C atoms, or, if n is 3, is a trivalent radical of an aliphatic, cycloaliphatic or aromatic tricarboxylic acid, of an aromatic tricarbamic acid or of a phosphorus-containing acid or a trivalent silyl radical, or, if n is 4, is a tetravalent radical of an aliphatic, cycloaliphatic or aromatic tetracarboxylic acid.

Any $C_1-C_{12}$alkyl substituent is, for example, methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

$C_1-C_{18}$Alkyl $R_1$ or $R_2$ can be, for example, the above-mentioned groups, and in addition also, for example, n-tridecyl, n-tetradecyl, n-hexadecyl or n-octadecyl.

$C_3-C_8$Alkenyl $R_1$ can be, for example, 1-propenyl, allyl, methallyl, 2-butenyl, 2-pentenyl, 2-hexenyl, 2-octenyl or 4-tert-butyl-2-butenyl.

$C_3-C_8$Alkinyl $R_1$ is preferably propargyl.

$C_7-C_{12}$Aralkyl $R_1$ is in particular phenethyl, and especially benzyl.

$C_1-C_8$Alkanoyl $R_1$ is, for example, formyl, propionyl, butyryl or octanoyl, but preferably acetyl, and $C_3-C_5$alkenoyl $R_1$ is, in particular, acryloyl.

A monovalent radical $R_2$ of a carboxylic acid is, for example, an acetic acid, caproic acid, stearic acid, acrylic acid, methacrylic acid, benzoic acid or β-(3,5-di-tert-butyl-4-hydroxyphenyl)-propionic acid radical.

A divalent radical $R_2$ of a dicarboxylic acid is, for example, a malonic acid, succinic acid, glutaric acid, adipic acid, suberic acid, sebacic acid, maleic acid, phthalic acid, dibutylmalonic acid, dibenzylmalonic acid, butyl-(3,5-di-tert-butyl-4-hydroxybenzyl)-malonic acid or bicycloheptenedicarboxylic acid radical.

A trivalent radical $R_2$ of a tricarboxylic acid is, for example, a trimellitic acid or a nitrilotriacetic acid radical.

A tetravalent radical $R_2$ of a tetracarboxylic acid is, for example, the tetravalent radical of butane-1,2,3,4-tetracarboxylic acid or of pyromellitic acid.

A divalent radical $R_2$ of a dicarbamic acid is, for example, a hexamethylenedicarbamic acid or a 2,4-toluylenedicarbamic acid radical.

Examples of sterically hindered amines of the formula (II) are the following compounds:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-tert-butyl-4-hydroxyphenyl)-propionate
9) di(1-benzyl-2,2,6,6-tetramethylpiperidin-4-yl) maleate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethyl-piperidin-4-yl) sebacate
16) di(1-allyl-2,2,6,6-tetramethylpiperidin-4-yl) phthalate
17) 1-propargyl-4-β-cyanoethyloxy-2,2,6,6-tetramethylpiperidine
18) 1-acetyl-2,2,6,6-tetramethylpiperidin-4-yl acetate
19) tri(2,2,6,6-tetramethylpiperidin4-yl) trimellitate
20) 1-acryloyl-4-benzyloxy-2,2,6,6-tetramethylpiperidine
21) di(2,2,6,6-tetramethylpiperidin-4-yl) diethylmalonate
22) di(1,2,2,6,6-pentamethylpiperidin-4-yl) dibutylmalonate
23) di(1,2,2,6,6-pentamethylpiperidin-4-yl) butyl-(3,5-di-tert-butyl-4-hydroxybenzyl)-malonate
24) di(1,2,2,6,6-pentamethylpiperidin-4-yl) dibenzylmalonate
25) di(1,2,3,6-tetramethyl-2,6-diethylpiperidin-4-yl) dibenzylmalonate
26) hexane- 1',6'-bis(4-carbamoyloxy-1-n-butyl-2,2,6,6-tetramethylpiperidine)

27) toluene-2+,4'-bis(4-carbamoyloxy-1-n-propyl-2,2,6,6-tetramethylpiperidine)

28) dimethylbis(2,2,6,6-tetramethylpiperidin-4-oxy)silane 29) phenyltris(2,2,6,6-tetramethylpiperidin-4-oxy)silane 30) tris(1-propyl-2,2,6,6-tetramethylpiperidin-4-yl) phosphite 31) tris(1-propyl-2,2,6,6-tetramethylpiperidin-4-yl) phosphate 32) phenyl [bis(1,2,2,6,6-pentamethylpiperidin-4-yl)] phosphonate 33) 4-hydroxy-1,2,2,6,6-pentamethylpiperidine 34) 4-hydroxy-N-hydroxyethyl-2,2,6,6-tetramethylpiperidine 35) 4-hydroxy-N-(2-hydroxypropyl)-2,2,6,6-tetramethylpiperidine 36) 1-glycidyl-4-hydroxy-2,2,6,6-tetramethylpiperidine b) compounds of the formula (III)

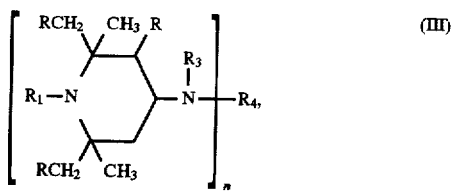

in which n is the number 1 or 2,

R and $R_1$ are as defined under formula (II), $R_2$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl or benzoyl and $R_4$, if n is 1, is hydrogen, $C_1$–$C_{18}$alkyl, $C_3$–$C_8$alkenyl, $C_5$–$C_7$cycloalkyl, $C_1$–$C_4$alkyl substituted by a hydroxyl, cyano, alkoxycarbonyl or carbamide group, glycidyl, or a group of the formula —$CH_2$—CH(OH)—Z or of the formula —CONH—Z, in which Z is hydrogen, methyl or phenyl, or, if n is 2, is $C_2$–$C_{12}$alkylene, $C_6$–$C_{12}$arylene, xylylene, a —$CH_2$—CH(OH)—$CH_2$— group or a group —$CH_2$—CH(OH)—$CH_2$—O—D—O—, in which D is $C_2$–$C_{10}$alkylene, $C_6$–$C_{15}$arylene or $C_6$–$C_{12}$cycloalkylene, or, provided that $R_3$ is not alkanoyl, alkenoyl or benzoyl, $R_4$ can also be a divalent radical of an aliphatic, cycloaliphatic or aromatic dicarboxylic acid or dicarbamic acid or also the group —CO—, or $R_3$ and $R_4$ together, if n is 1, can be the divalent radical of an aliphatic, cycloaliphatic or aromatic 1,2- or 1,3-dicarboxylic acid.

Any $C_1$–$C_{12}$- or $C_1C_{18}$alkyl substituents are as already defined under a).

Any $C_5$–$C_7$cycloalkyl substituents are, in particular, cyclohexyl.

$C_7$–$C_8$aralkyl $R_3$ is in particular phenethyl, or especially benzyl. $C_2$–$C_5$Hydroxyalkyl $R_3$ is, in particular, 2-hydroxyethyl or 2-hydroxypropyl.

$C_2$–$C_{18}$alkanoyl $R_3$ is, for example, propionyl, butyryl, octanoyl, dodecanoyl, hexadecanoyl or octadecanoyl, but preferably acetyl, and $C_3$–$C_5$alkenoyl $R_3$ is, in particular, acryloyl.

$C_2$–$C_8$alkenyl $R_4$ is, for example, allyl, methallyl, 2-butenyl, 2-pentenyl, 2-hexenyl or 2-octenyl.

$C_1$–$C_4$alkyl $R_4$ substituted by a hydroxyl, cyano, alkoxycarbonyl or carbamide group can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)-ethyl Any $C_2$–$C_{12}$alkylene substituents are, for example ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene or 4,4'-diphenylene.

$C_6$–$C_{12}$cycloalkylene D is, in particular, cyclohexylene.

The divalent radical $R_3$ and $R_4$ together, if n is 1, of an aliphatic, cycloaliphatic or aromatic 1,2- or 1,3-dicarboxylic acid is, for example, the radical of succinic acid, glutaric acid or phthalic acid.

Examples of sterically hindered amines of the formula (III) are the following compounds:

37) N,N'-bis(2,2,6,6-tetramethylpiperidin-4-yl) hexamethylene-1,6-diamine

38) N,N'-bis(2,2,6,6-tetramethylpiperidin-4-yl) hexamethylene-1,6-diacetamide 39) 1-acetyl-4-(N-cyclohexylacetamido)-2,2,6,6-tetramethylpiperidine 40) 4-benzoylamino-2,2,6,6-tetramethylpiperidine 41) N,N'-bis(2,2,6,6-tetramethylpiperidin-4-yl)-N,N'-dibutyladipamide 42) N,N'-bis(2,2,6,6-tetramethylpiperidin-4-yl)-N,N'-dicyclohexyl-2-hydroxypropylene -1,3-diamine 43) N,N'-bis(2,2,6,6-tetramethylpiperidin-4-yl)-p-xylylenediamine 44) N,N'-bis(2,2,6,6-tetramethylpiperidin-4-yl) succindiamide 45) di-(2,2,6,6-tetramethylpiperidin-4-yl) N-(2,2,6,6-tetramethylpiperidin-4-yl)-β-aminodipropionate 46) the compound of the formula

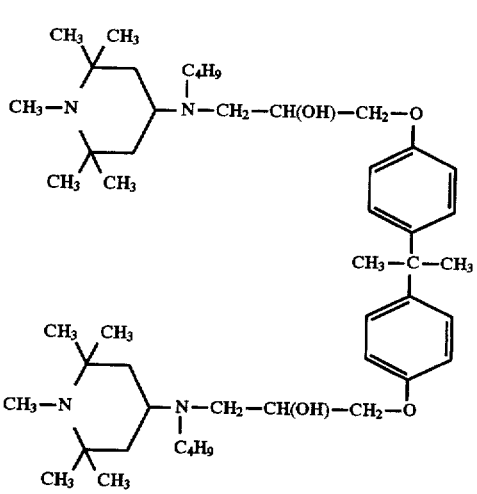

47) 4-(bis-2-hydroxyethylamino)-1,2,2,6,6-pentamethylpiperidine 48) 4-(3-methyl-4-hydroxy-5-tert-butylbenzoamido)-2,2,6,6-tetramethylpiperidine 49) 4-methacrylamido-1,2,2,6,6-pentamethylpiperidine 49a) the compound of the formula

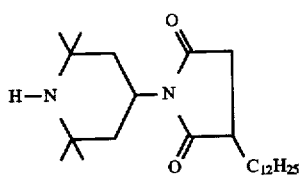

49b) the compound of the formula

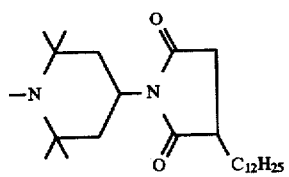

49c) 4-amino-2,2,6,6-tetramethylpiperidine
49d) 4-amino-1,2,2,6,6-pentamethylpiperidine.

c) Compounds of the formula (IV)

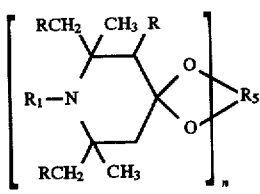

in which n is the number 1 or 2,

R and $R_1$ are as deemed under a) and $R_5$, if n is 1, is $C_2$-$C_8$alkylene or -hydroxyalkylene or $C_4$-$C_{22}$acyloxyalkylene, or, if n is 2, is the group (—$CH_2$)$_2$C($CH_2$—)$_2$.

$C_2$-$C_8$alkylene or -hydroxyalkylene $R_5$ is, for example, ethylene, 1-methyl-ethylene, propylene, 2-ethyl-propylene or 2-ethyl-2-hydroxymethylpropylene.

$C_4$-$C_{22}$acyloxyalkylene $R_5$ is, for example, 2-ethyl-2-acetoxymethylpropylene.

Examples of sterically hindered amines of the formula (IV) are the following compounds:

50) 9-aza-8,8,10,10-tetramethyl-1,5-dioxaspiro[5.5]undecane 51) 9-aza-8,8,10,10-tetramethyl-3-ethyl-1,5-dioxaspiro[5.5]undecane 52) 8-aza-2,7,7,8,9,9-hexamethyl-1,4-dioxaspiro[4.5]decane 53) 9-aza-3-hydroxymethyl-3-ethyl-8,8,9,10,10-pentamethyl-1,5-dioxaspiro[5.5]undecane 54) 9-aza-3-ethyl-3-acetoxymethyl-9-acetyl-8,8,10,10-tetramethyl-1,5-dioxaspiro[5.5]undecane 55) 2,2,6,6-tetramethylpiperidine-4-spiro-2'-(1',3'-dioxane)-5'-spiro-5"-(1",3"-dioxan)-2"-spiro-4'"-(2'",2'",6'",6'"-tetramethylpiperidine).

d) Compounds of the formula VA, VB and VC

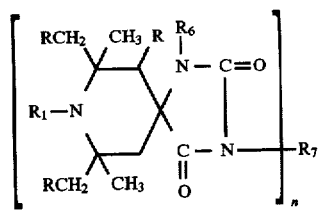

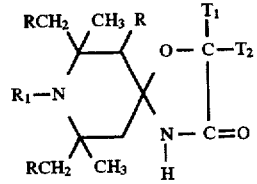

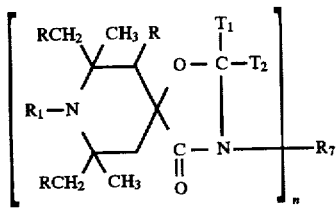

in which n is the number 1 or 2,

R and $R_1$ are as defined under formula (II), $R_6$ is hydrogen, $C_1$-$C_{12}$alkyl, allyl, benzyl, glycidyl or $C_2$-$C_6$alkoxyalkyl and $R_7$, if n is 1, is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or a group of the formula —($CH_2$)$_p$—COO—Q or of the formula —($CH_2$)$_p$—O—CO—Q, in which p is 1 or 2 and Q is $C_1$-$C_4$alkyl or phenyl, or, if n is 2, is $C_2$-$C_{12}$alkylene, $C_4$-$C_{12}$alkenylene, $C_6$-$C_{12}$arylene, a group —$CH_2$—CH(OH)—$CH_2$—O—D—O—$CH_2$—CH(OH)—$CH_2$—, in which D is $C_2$-$C_{10}$alkylene, $C_6$-$C_{15}$arylene, $C_6$-$C_{12}$cycloalkylene, or a group —$CH_2$CH(OZ')CH_2$—(OCH$_2$—CH(OZ')CH$_2$)$_2$—, in which Z' is hydrogen, $C_1$-$C_{18}$alkyl, allyl, benzyl, $C_2$-$C_{12}$alkanoyl or benzoyl, $T_1$ and $T_2$ independently of one another are hydrogen, $C_1$-$C_{18}$alkyl, $C_6$-$C_{10}$aryl or $C_7$-$C_9$aralkyl which are unsubstituted or substituted by halogen or $C_1$-$C_4$alkyl, or $T_1$ and $T_2$, together with the C atom joining them, form a $C_5$-$C_{12}$cycloalkane ring.

Any $C_1$-$C_{12}$alkyl substituents are, for example, methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

Any $C_1$-$C_{18}$alkyl substituents can be, for example, the groups defined above, and in addition also, for example, n-tridecyl, n-tetradecyl, n-hexadecyl or n-octadecyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$-$C_5$alkenyl $R_7$ is, for example, 1-propenyl, allyl, methallyl, 2-butenyl or 2-pentenyl.

$C_7$-$C_9$aralkyl $R_7$, $T_1$ and $T_2$ are in particular phenethyl, or above all benzyl. A cycloalkane ring $T_1$ and $T_2$ together with the C atom can be, for example, a cyclopentane, cyclohexane, cyclooctane or cyclododecane ring.

$C_2$–$C_4$hydroxyalkyl $R_7$ is, for example, 2-hydroxyethyl, 2-hydroxypropyl, 2-hydroxybutyl or 4-hydroxybutyl.

$C_6$–$C_{10}$aryl $R_7$, $T_1$ and $T_2$ are, in particular, phenyl or α- or β-naphthyl, which are unsubstituted or substituted by halogen or $C_1$–$C_4$alkyl.

$C_2$–$C_{12}$alkylene $R_7$ is, for example, ethylene, propylene, 2,2-dimethylpropylene, tetramethylene, hexamethylene, octamethylene, decamethylene or dodecamethylene.

$C_4$–$C_{12}$alkenylene $R_7$ is, in particular, 2-butenylene, 2-pentenylene or 3-hexenylene.

62) 2,2-dibutyl-7,7,9,9-tetramethyl-1-oxa-3,8-diaza-4-oxospiro[4.5]decane 63) 2,2,4,4-tetramethyl-7-oxa-3,20-diaza-21-oxodispiro[5.1.11.2]heneicosane 64) 2-butyl-7,7,9,9-tetramethyl-1-oxa-4,8-diaza-3-oxospiro[4.5]decane 65) 8-acetyl-3-dodecyl-1,3,8-triaza-7,7,9,9-tetramethylspiro[4.5]decane-2,4-dione or the compounds of the following formulae:

66) 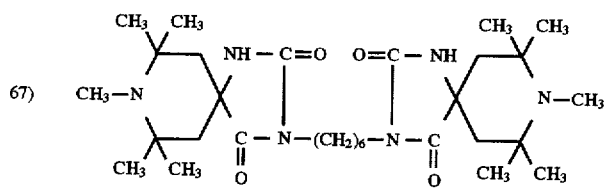

67) 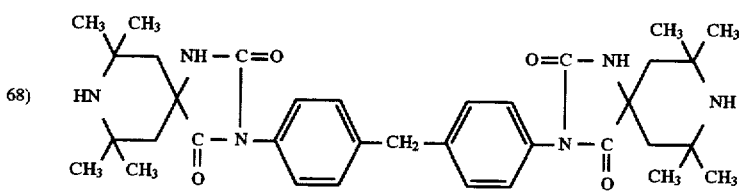

68) 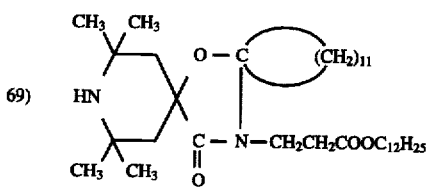

69) 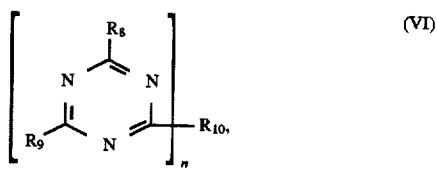

$C_6$–$C_{12}$arylene $R_7$ is, for example, o-, m- or p-phenylene, 1,4-naphthylene or 4,4'-diphenylene.

$C_2$–$C_{12}$alkanoyl Z' is, for example, propionyl, butyryl, octanoyl or dodecanoyl, but preferably acetyl.

$C_2$–$C_{10}$alkylene, $C_6$–$C_{15}$arylene or $C_6$–$C_{12}$cycloalkylene D is as defined under formula (III).

Examples of sterically hindered amines of the formulae (VA), (VB) and (VC) are the following compounds:

56) 3-benzyl-1,3,8-triaza-7,7,9,9-tetramethylspiro[4.5]decane-2,4-dione 57) 3-n-octyl-1,3,8-triaza-7,7,9,9-tetramethylspiro[4.5]decane-2,4-dione 58) 3-allyl-1,3,8-triaza-1,7,7,9,9-pentamethylspiro[4.5]decane-2,4-dione 59) 3-glycidyl-1,3,8-triaza-7,7,8,9,9-pentamethylspiro[4.5]decane-2,4-dione 60) 1,3,7,7,8,9,9-heptamethyl-1,3,8-triazaspiro[4.5]decane-2,4-dione 61) 2-isopropyl-7,7,9,9-tetramethyl-1-oxa-3,8-diaza-4-oxospiro[4.5]decane e) compounds of the formula VI

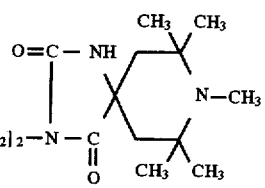 (VI)

in which n is the number 1 or 2 and $R_8$ is a group of the formula

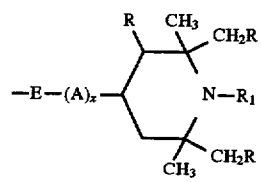

in which R and $R_1$ are as defined under formula (II), E is —O— or —$NR_{11}$—, A is $C_2$–$C_6$alkylene or —$(CH_2)_3$—O— and x is the number 0 or 1.

$R_9$ is the same as $R_8$ or is one of the groups $-NR_{11}R_{12}$, $-OR_{13}$, $-NHCH_2OR_{13}$ or $-N(CH_2OR_{13})_2$.

$R_{10}$, if n is 1, is the same as $R_8$ or $R_9$, or, if n is 2, is a group $-E-B-E-$, in which B is $C_2-C_6$alkylene, which may be interrupted by $-N(R_{11})-$, $R_{11}$ is $C_1-C_{12}$alkyl, cyclohexyl, benzyl or $C_1-C_4$hydroxyalkyl, or a group of the formula

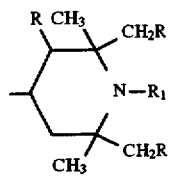

$R_{12}$ is $C_1-C_{12}$alkyl, cyclohexyl, benzyl or $C_1-C_4$hydroxyalkyl and $R_{13}$ is hydrogen, $C_1-C_{12}$alkyl or phenyl, or $R_{11}$ and $R_{12}$ together are $C_4-C_5$alkylene or -oxaalkylene, for example

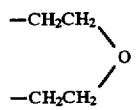

or a group of the formula

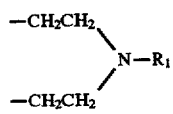

or $R_{11}$ and $R_{12}$ are also each a group of the formula

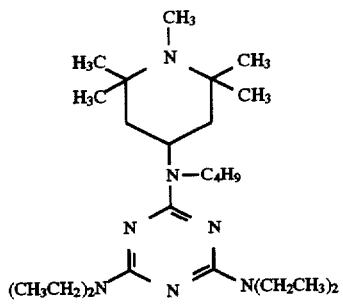

Any $C_1-C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1-C_4$hydroxyalkyl substituents are, for example, 2-hydroxyethyl, 2-hydroxypropyl, 3-hydroxypropyl, 2-hydroxybutyl or 4-hydroxybutyl.

$C_2-C_6$alkylene A is, for example, ethylene, propylene, 2,2-dimethylpropylene, tetramethylene or hexamethylene.

$C_4-C_5$alkylene or -oxaalkylene $R_{11}$ and $R_{12}$ together is, for example, tetramethylene, pentamethylene or 3-oxapentamethylene.

Examples of sterically hindered amines of the formula (VI) are the compounds of the following formulae:

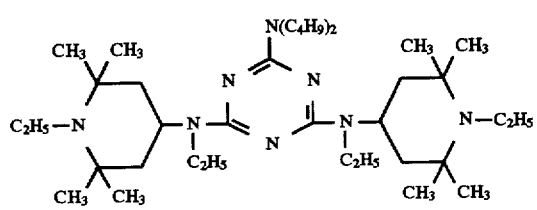

70)

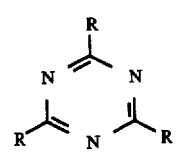

71)

72)

-continued
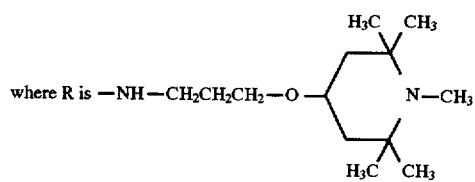
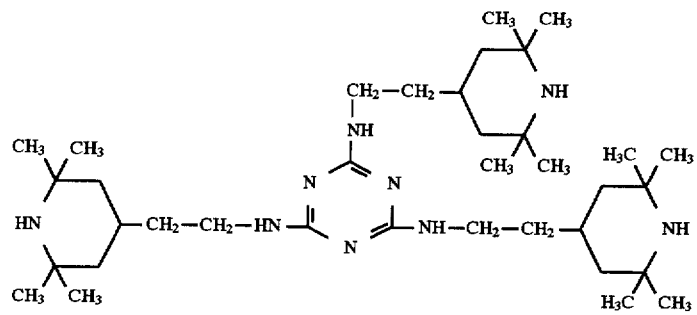
73)
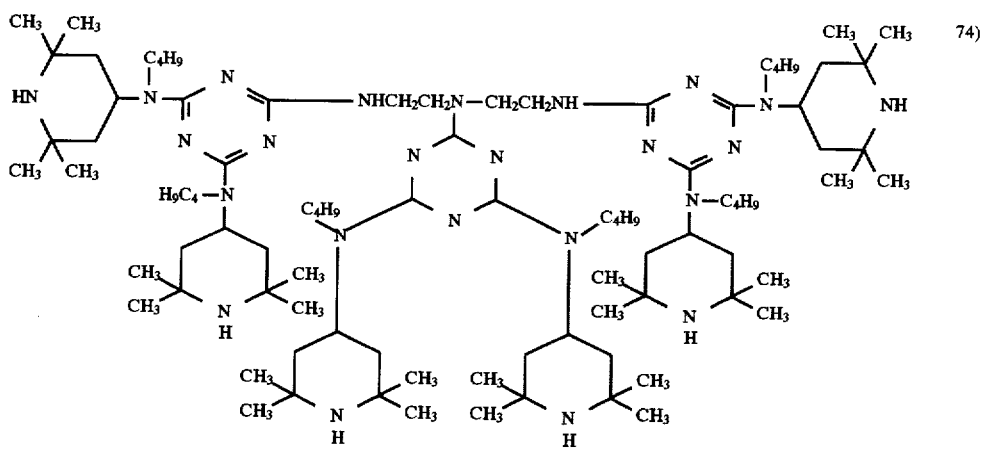
74)
75)
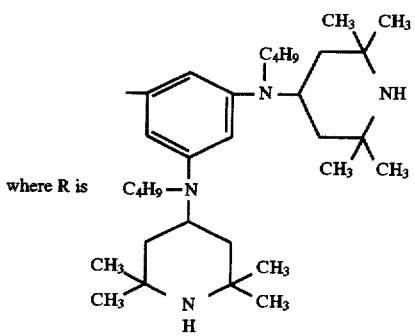
76)

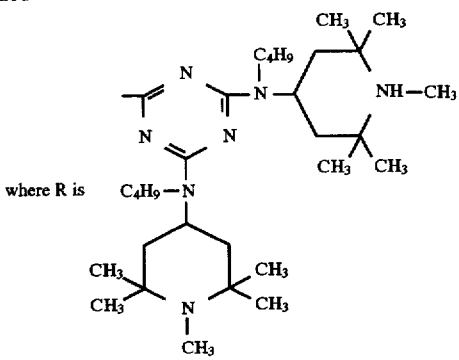
77)
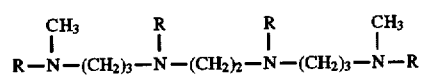
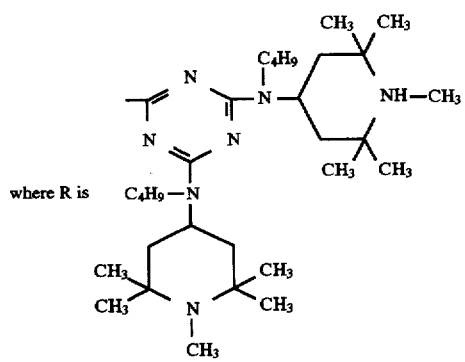
78)
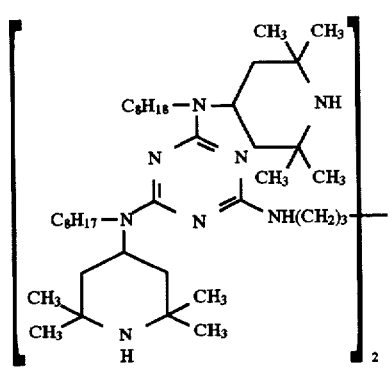
79)
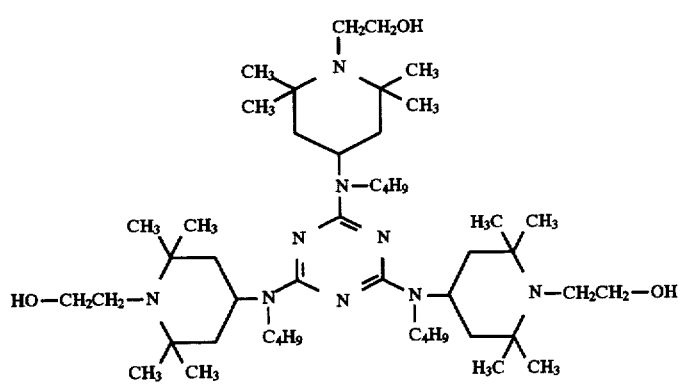

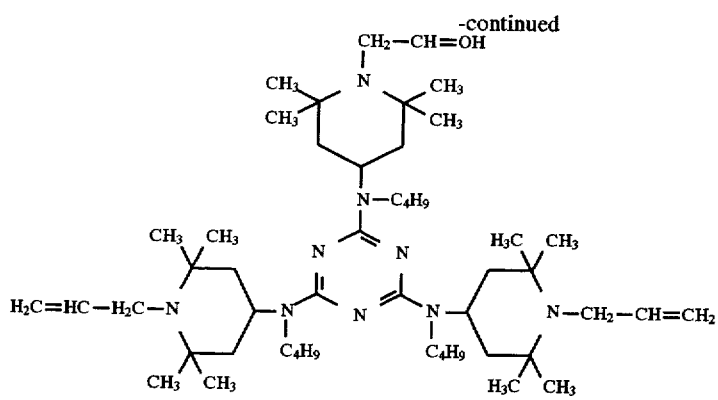

80)

f) Oligomeric or polymeric compounds, the recurring structural unit of which contains a 2,2,6,6-tetraalkylpiperidine radical of the formula (I), in particular polyesters, polyethers, polyamides, polyamines, polyurethanes, polyureas, polyaminotriazines, poly (meth)acrylates, poly(meth)acrylamides and copolymers thereof which contain such radicals.

Examples of sterically hindered amines of this class are the compounds of the following formulae:

in which m is a number from 2 to about 200.

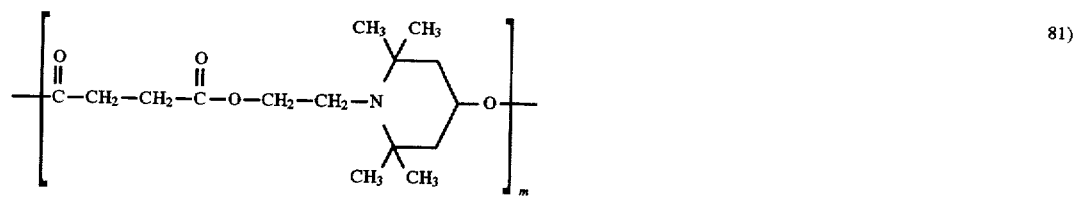

81)

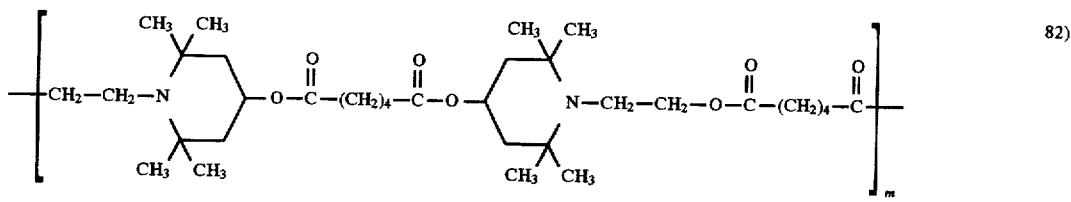

82)

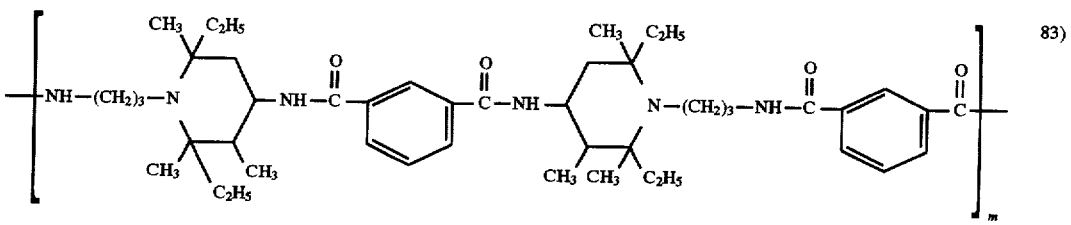

83)

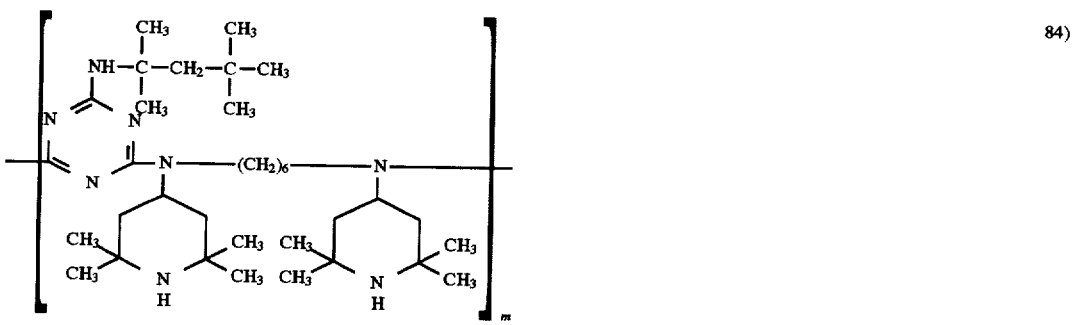

84)

85)

86)
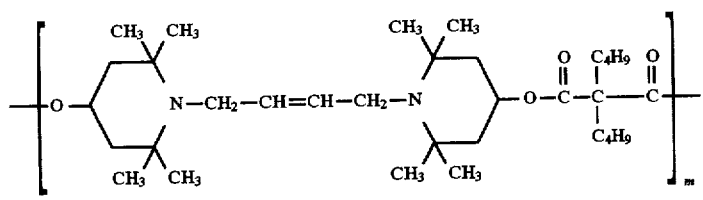
87)
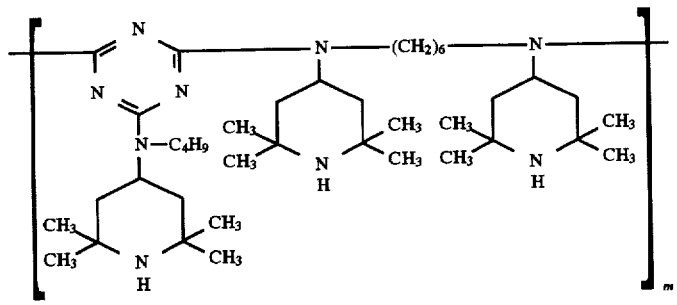
88)
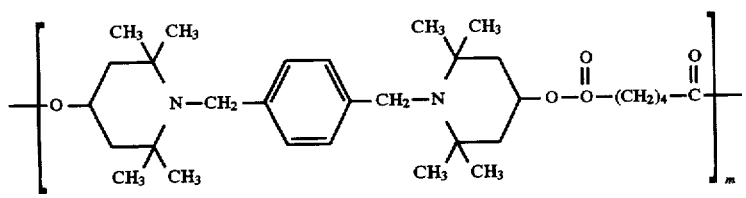
89)
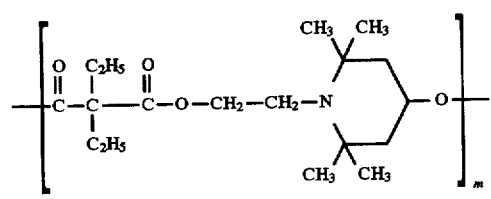
90)
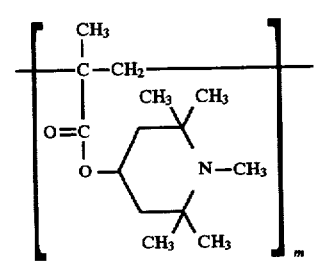
91)
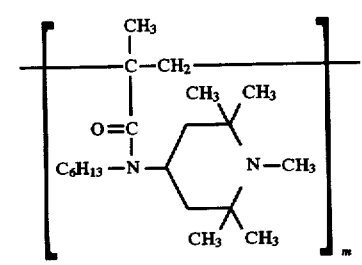

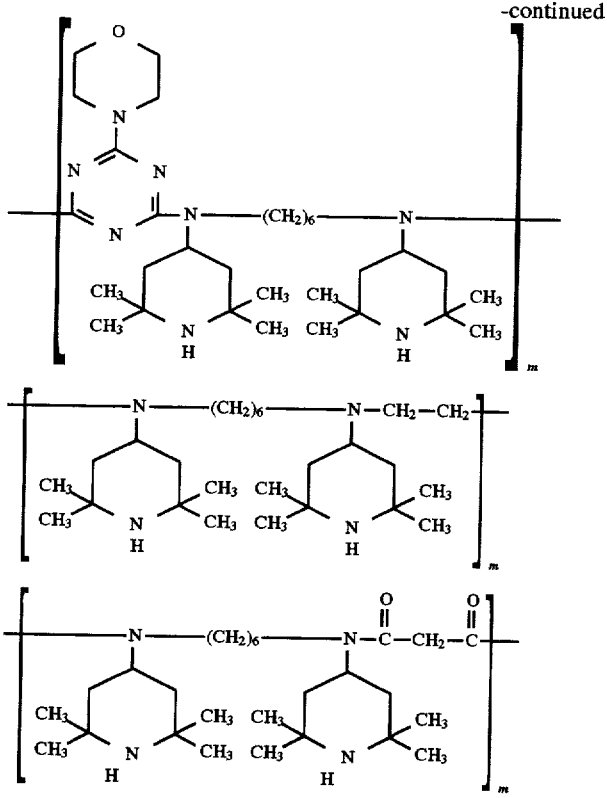

92)

93)

94)

The compounds of the formulae (II)–(VI) are known or can be prepared by processes known per se. The compounds of the formula (II) are known, for example, from U.S. Pat. No. 3,840,494 and can be prepared by the processes described therein.

Preferred oligomeric compounds are those having a low molecular weight (<700).

Preferred UV absorbers which are used according to the invention are the following compounds:

a) 2-(2'-Hydroxyphenyl)-benzotriazoles, for example 2-(2'-hydroxy-5'-methylphenyl)-benzotraizole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)-benzotriazole, 2-(2'-hydroxy-4'-octoxyphenyl)-benzotriazole, 2-(3',5'-di-tert-amyl-2'-hydroxyphenyl)-benzotriazole, 2-(3',5'-bis-(α,α-dimethylbenzyl)-2'-hydroxyphenyl)-benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3-dodecyl-2'-hydroxy-5'-methylphenyl)-benzotriazole, 2-(3'-tert-butyl-2'-hydroxy-5'-(2-isooctyloxycarbonylethyl)phenyl-benzotriazole, and 2,2'-methylene-bis[4-(1,1,3,3-tetramethylbutyl)-6-benzotriazol-2-yl-phenol]; transesterification product of 2-[3-tert-butyl- 5'-(2-methoxycarbonylethyl)-2'-hydroxy-phenyl]-benzotriazole with polyethylene glycol 300;and [R—CH₂CH₂—COO(CH₂)₃–]₂, in which R is 3'-tert-butyl-4'-hydroxy-5'-2H-benzotriazol-2-yl-phenyl.

b) 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

c) Esters of substituted or unsubstituted benzoic acids, for example 4-tert-butyl-phenyl salicylate, phenyl salicylate, octylphenyl salicylate, dibenzoylresorcinol, bis-(4-tert-butylbenzoyl)-resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate.

d) 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)4,6-bis-(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)4,6-bis(4-methylphenyl)- 1,3,5-triazine, 2-(2-hydroxy4-dodecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine and 2-[2-hydroxy-4-(2-hydroxy-3-octyloxy-propyloxy) phenyl]4,6-bis(2,4-dimethylphenyl)-1,3,5-triazine.

Preferred antioxidants which are used according to the invention are the following compounds:

a) Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-iso-butylphenol, 2,6-di-cyclopentyl-4-methylphenol, 2-(α-methylcyclohexyl)-4,6-dimethylphenol, 2,6-di-octadecyl-4-methylphenol, 2,4,6-tri-cyclohexylphenol, 2,6-di-tert-butyl-4-methoxymethylphenol, 2,6-di-nonyl-4-methylphenol, 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1'-yl)-phenol and mixtures thereof.

b) Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol and 2,6-di-dodecylthiomethyl-4-nonylphenol.

c) Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate and bis-(3,5-di-tert-butyl-4-hydroxyphenyl) adipate.

d) Hydroxylated thiodiphenyl ethers, for example 2,2'-thio-bis-(6-tert-butyl-4-methylphenol), phenol), 2,2'-thio-bis-(4-octylphenol), 4,4'-thio-bis-(6-tert-butyl-3-methylphenol), 4,4'-thio-bis-(6-tert-butyl-2-methylphenol), 4,4'-thio-bis-(3,6-di-sec-amylphenol), 4,4'-bis-(2,6-dimethyl-4-hydroxyphenyl) disulfide.

e) Alkylidene-bisphenols, for example 2,2'-methylene-bis-(6-tert-butyl-4-methylphenol), 2,2'-methylene-bis-(6-tert-butyl-4-ethylphenol), 2,2'-methylene-bis-[4-methyl-6-(α-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-di-tert-butylphenol), 2,2'-ethylidene-bis-(4,6-di-tert-butylphenol), 2,2'-ethylidene-bis-(6-tert-butyl-4-isobutylphenol), 2,2'-methylene-bis-[6-(α-methyl-benzyl)-4-nonylphenol], 2,2'-methylene-bis-[6-(α,α-dimethylbenzyl)-4-nonylphenol], 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenyl)-butane, 2,6-bis-(3-tert-butyl-5-methyl-2-hydroxybenzyl)-4-methylphenol, 1,1,3-tris-(5-tert-butyl-4-hydroxy-2-methylphenyl)-butane, 1,1-bis-(5-tert-butyl-4-hydroxy-2-methyl-phenyl)-3-n-dodecylmercaptobutane, ethylene glycol bis-[3,3-bis-(3'-tert-butyl-4'-hydroxyphenyl)-butyrate], bis-(3-tert-butyl-4-hydroxy-5-methyl-phenyl)-dicyclopentadiene, bis-[2-(3'-tert-butyl-2'-hydroxy-5'-methyl-benzyl)-6-tert-butyl-4-methyl-phenyl] terephthalate, 1,1-bis(3,5-dimethyl-2-hydroxyphenyl)-butane, 2,2-bis-(3,5-di-tert-butyl-4-hydroxyphenyl)propane, 2,2-bis-(5-tert-butyl-4-hydroxy-2-methylphenyl)-4-n-dodecylmercapto-butane and 1,1,5,5-tetra-(5-tert-butyl-4-hydroxy-2-methylphenyl)-pentane.

f) O—, N— and S-benzyl compounds, for example 3,5,3',5'-tetra-tert-butyl-4,4'-dihydroxydibenzyl ether, octadecyl 4-hydroxy-3,5-dimethylbenzyl-mercaptoacetate, tris-(3,5-di-tert-butyl-4-hydroxybenzyl)-amine, bis-(4-tert-butyl-3-hydroxy-2,6-dimethylbenzyl) dithioterephthalate, bis-(3,5-di-tert-butyl-4-hydroxybenzyl) sulfide and isooctyl 3,5-di-tert-butyl-4-hydroxybenzyl-mercaptoacetate.

g) Hydroxybenzylated malonates, for example dioctadecyl 2,2-bis-(3,5-di-tert-butyl-2-hydroxybenzyl)-malonate, di-octadecyl 2-(3-tert-butyl-4-hydroxy-5-methylbenzyl)-malonate, di-dodecylmercaptoethyl 2,2-bis-(3,5-di-tert-butyl-4-hydroxybenzyl)-malonate and di-[4-(1,1,3,3-tetramethylbutyl)-phenyl] 2,2-bis-(3,5-di-tert-butyl-4-hydroxy-benzyl)-malonate.

h) Hydroxybenzyl aromatics, for example 1,3,5-tris-(3,5-di-tert-butyl-4-hydroxybenzyl)-2,4,6-trimethylbenzene, 1,4-bis-(3,5-di-tert-butyl-4-hydroxybenzyl)-2,3,5,6-tetramethylbenzene and 2,4,6-tris-(3,5-di-tert-butyl-4-hydroxybenzyl)-phenol.

i) Triazine compounds, for example 2,4-bis-octylmercapto-6-(3,5-di-tert-butyl-4-hydroxyanilino)-1,3,5-triazine, 2-octylmercapto-4,6-bis-(3,5-di-tert-butyl-4-hydroxyphenoxy)-1,3,5-triazine, 2-octylmercapto-4,6-bis-(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris-(3,5-di-tert-butyl-4-hydroxyphenylpropionyl)-hexahydro-1,3,5-triazine and 1,3,5-tris-(3,5-dicyclohexyl-4-hydroxybenzyl) isocyanurate.

j) Benzyl phosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, diocta-decyl 5-tert-butyl-4-hydroxy-3-methylbenzylphosphonate and the Ca salt of 3,5-di-tert-butyl-4-hydroxybenzyl-phosphonic acid monoethyl ester.

k) Acylaminophenols, for example 4-hydroxy-lauric acid anilide, 4-hydroxystearic acid anilide and octyl N-(3,5-di-tert-butyl-4-hydroxyphenyl)-carbamate.

l) Esters of β-(3,5-di-tert-butyl-4-hydroxyphenyl)-propionic acid with mono- or polyhydric alcohols, for example with methanol, ethanol, octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris-(hydroxyethyl) isocyanurate, N,N'-bis-(hydroxyethyl)-oxalic acid diamide, 3-thiaundecanol, 3-thiapentadecanol, trimethylhexanediol, trimethylolpropane and 4-hydroxymethyl-1-phospha-2,6,7-trioxabicyclo-[2.2.2]-octane.

m) Esters of β-(5-tert-butyl-4-hydroxy-3-methylphenyl)-propionic acid with mono- or polyhydric alcohols, for example with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris-(hydroxy)ethyl isocyanurate, N,N'-bis-(hydroxyethyl)-oxalic acid diamide, 3-thiaundecanol, 3-thiapentadecanol, trimethylhexanediol, trimethylolpropane and 4-hydroxymethyl-1-phospha-2,6,7-trioxabicyclo-[2.2.2]-octane.

n) Esters of β-(3,5-dicyclohexyl-4-hydroxyphenyl)-propionic acid with mono- or polyhydric alcohols, for example with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris-(hydroxy)ethyl isocyanurate, N,N'-bis- (hydroxyethyl)-oxalic acid diamide, 3-thiaundecanol, 3-thiapentadecanol, trimethylhexanediol, trimethylolpropane and 4-hydroxymethyl-1-phospha-2,6,7-trioxabicyclo-[2.2.2]-octane.

o) Esters 3,5-di-tert-butyl1-4-hydroxyphenylacetic acid with mono- or polyhydric alcohols, for example with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris-(hydroxy)ethyl isocyanurate, N,N'-bis-(hydroxyethyl)-oxalic acid diamide, 3-thiaundecanol, 3-thiapentadecanol, trimethylhexanediol, trimethylolpropane and 4-hydroxymethyl-1-phospha-2,6,7-trioxabicyclo-[2.2.2]-octane.

p) Amides of β-(3,5-di-tert-butyl-4-hydroxyphenyl)-propionic acid for example N,N'-bis-(3,5-di-tert-butyl-4-hydroxyphenylpropionyl)-hexamethylenediamine, N,N'-bis-(3,5-di-tert-butyl-4-hydroxyphenylpropionyl)-trimethylenediamine and N,N'-bis-(3,5-di-tert-butyl-4-hydroxyphenylpropionyl)-hydrazine.

In addition to these compounds, the novel physical forms of the sterically hindered amines, UV absorbers and antioxidants comprise, as the emulsifier or dispersant, a polyalcohol which is completely or partly esterified with a fatty acid.

Polyalcohols are, for example, glycol, diglycol, alkylene or dialkylene glycols, sorbitan, sorbitol, mannitol, xylitol, pentaerythritol, diglycerol, glycerol and glycerylsorbitol.

Suitable fatty acids are, for example, fatty acids having 6 to 25 carbon atoms, for example caprylic, capric, lauric, myristic, palmitic, stearic, arachic, behenic, coconut fat-($C_8$–$C_{18}$), decenoic, dodecenoic, tetradecenoic, hexadecenoic, oleic, linoleic, linolenic, eicosenoic, docosenoic or clupanodonic acid.

Preferred compounds from the group of polyalcohols completely or partly esterified with fatty acids are sorbitan, sorbitol, mannitol, xylitol and pentaerythritol, which are esterified with 1 to 3 mol of a coconut fat-($C_8$–$C_{18}$) acid, in particular lauric, palmitic, stearic, oleic, linoleic or linolenic acid. Sorbitan esterified with 1 to 3, in particular about 1 mol of oleic acid, is particularly preferred.

The physical forms according to the invention of the sterically hindered amines, UV absorbers and antioxidants furthermore comprise, as a further emulsifier or dispersant, a reaction product of a polyalcohol, which is completely or partly esterified with a fatty acid, with an alkylene oxide.

The polyalcohols and fatty acids are the compounds defined above, and alkylene oxides are in particular propylene oxide, and especially ethylene oxide.

Reaction products of 1 mol of polyalcohol, which is completely or partly esterified with a fatty acid, with 5 to 200 mol, in particular 5 to 40 mol of ethylene oxide are preferably used.

Reaction products of sorbitan esterified with 1 to 3, in particular about 1 mol of oleic acid with 5 to 40 mol of ethylene oxide are particularly suitable.

Preferred physical forms according to the invention of sterically hindered amines comprise a) 75 to 95% by weight of a water-insoluble sterically hindered amine and b) 25 to 5% by weight of a mixture of b1) a polyalcohol which is completely or partly esterified with a fatty acid and b2) a reaction product of a polyalcohol, which is completely or partly esterified with a fatty acid, and an alkylene oxide, the ratio of components b1):b2) being between 9:1 and 5:5.

Preferred physical forms according to the invention of UV absorbers comprise a) 75 to 95% by weight of a water-insoluble UV absorber and b) 25 to 5% by weight of a mixture of b1) a polyalcohol which is completely or partly esterified with a fatty acid and b2) a reaction product of a polyalcohol, which is completely or partly esterified with a fatty acid, and an alkylene oxide, the ratio of components b1):b2) being between 9:1 and 5:5.

Preferred physical forms according to the invention of antioxidants comprise a) 75 to 95% by weight of a water-insoluble antioxidant and b) 25 to 5% by weight of a mixture of b1) a polyalcohol which is completely or partly esterified with a fatty acid and b2) a reaction product of a polyalcohol, which is completely or partly esterified with a fatty acid, and an alkylene oxide, the ratio of components b1):b2) being between 1:9 and 5:5.

As other additives, the physical forms according to the invention can also comprise, for example, water, stabilizers, diluents, fat-liquoring agents, agents which influence handle, acrylic resins, polyurethanes, flameproofing agents or emulsion carriers. The physical forms according to the invention or the aqueous liquors according to the invention furthermore can also comprise hydrophobizing agents, for example fluorohydrocarbons or fluorocarbon resins, for example perfluorinated alkyl iodides or perfluoroalkyl monoiodoperfluoroalkyl ethers having 5 to 18, preferably 7 to 14 C atoms.

The physical forms according to the invention are suitable for stabilizing a large number of substrates against thermal and photochemical decomposition, for example for textile coatings of polyurethanes, acrylates, silicone acrylates or styrene-containing copolymers, for imitation leather of polyester/polyurethane or polyamide/polyurethane, for polypropylene and in particular for leather, preferably for aniline, nubuck and suede leather and for lightly dressed grain leather for upholstery and clothing.

The physical forms according to the invention can be incorporated without problems into aqueous latices or directly into aqueous liquors and can be used in a wide pH range, for example from about 6 to 12.

The aqueous liquors can be applied here to undyed or dyed material before, during or after dyeing, for example by an exhaust method at liquor ratios of 1:5 to 1:200, preferably 1:10 to 1:50, for example in a circulating apparatus or a winch beck. It is also possible to stabilize the substrates mentioned in an aftertreatment by adding the physical forms according to the invention comprising sterically hindered amine, UV absorber and/or antioxidants to the exhausted dyebath, in the dye liquor, directly after the dyeing process.

However, the aqueous liquors comprising emulsifier or dispersant and sterically hindered amine, UV absorber and/or antioxidant can also be applied continuously by means of low application systems or hot application systems.

Preferably, the aqueous liquors comprising emulsifier or dispersant and sterically hindered amine, UV absorber and/or antioxidant are applied in a spray application process or in a roller application process to the substrate to be treated.

However, it is also possible to incorporate the physical forms according to the invention comprising emulsifier or dispersant and sterically hindered amine, UV absorber and/or antioxidant into customary water-based leather care agents, for example into creams, gels or sprays.

The following examples illustrate the invention. Parts and percentages are by weight. The percentages regarding additions to the individual treatment baths or dyebaths relate to the substrate, unless noted otherwise. The temperatures are stated in degrees Celsius.

EXAMPLE 1

A liquid physical form of the following composition is prepared by mixing the components at room temperature:

90% of the sterically hindered amine of the formula

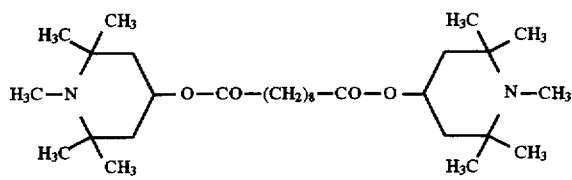

5% of sorbitan monooleate and

5% of the reaction product of about 20 mol of ethylene oxide and 1 mol of sorbitan monooleate.

The resulting physical form has a long shelf life and can be emulsified very easily in water.

EXAMPLE 2

A liquid physical form of the following composition is prepared by mixing the components at room temperature:

90% of the UV absorber of the formula

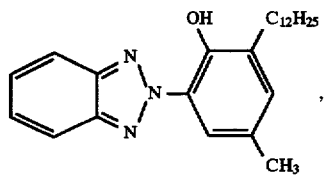

3% of sorbitan monooleate and

7% of the reaction product of about 20 mol of ethylene oxide and I mol of sorbitan monooleate.

The resulting physical form has a long shelf life and can be emulsified very easily in water.

EXAMPLE 3

A liquid physical form of the following composition is prepared by mixing the components at room temperature:

90% of the antioxidant of the formula

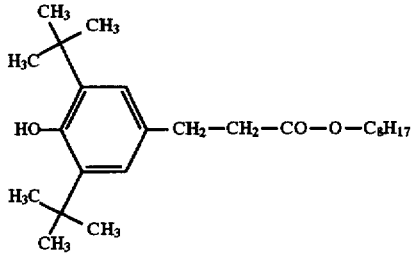

7% of sorbitan monooleate and

3% of the reaction product of about 20 mol of ethylene oxide and 1 mol of sorbitan monooleate.

The resulting physical form has a long shelf life and can be emulsified very easily in water.

EXAMPLE 4

A liquid physical form of the following composition is prepared by mixing the components at room temperature:

40% of the sterically hindered amine from Example 1,

30% of the UV absorber from Example 2,

20% of the antioxidant from Example 3,

5% of sorbitan monooleate and

5% of the reaction product of about 20 mol of ethylene oxide and 1 mol of sorbitan monooleate.

The resulting physical form has a long shelf life and can be emulsified very easily in water.

EXAMPLE 5

An aqueous finish of the following composition for the treatment of leather is prepared by mixing the components at room temperature:

80 parts of the physical form, described in Example 1, of the sterically hindered amine, 70 parts of the physical form, described in Example 2, of the UV absorber, 50 parts of the physical form, described in Example 3, of the antioxidant and 800 parts of water.

EXAMPLE 6

100 parts of chrome-tanned cowhide (shaved weight) are washed in 300 parts of water at 30° C. for 15 minutes and then neutralized for 60 minutes at 30° C. in a liquor comprising 300 parts of water, 2 parts of neutralizing agent (Na salts of aromatic sulfonic acids and aliphatic dicarboxylic acids) and 0.5 part of sodium bicarbonate. A washing operation in 300 parts of water at room temperature lasting 15 minutes then follows.

The leather treated in this way is now dyed at 50° C. in a liquor comprising 300 parts of water and 2.01 parts of the dye mixture comprising 0.67 part of the yellow dye of the formula

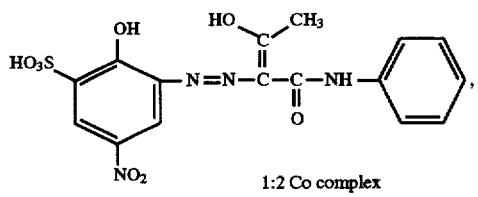

1:2 Co complex 0.67 part of the red dye of the formula

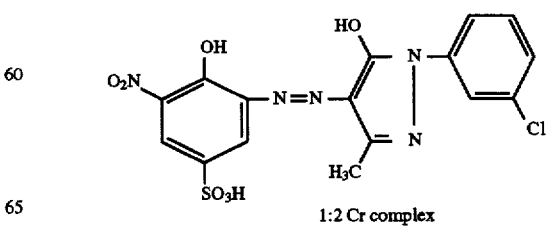

1:2 Cr complex and 0.67 part of the blue dye of the formula

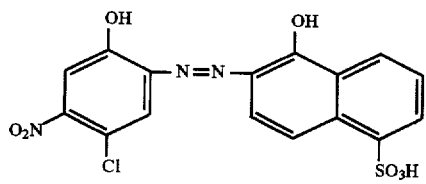

1:2 Cr complex

After a dyeing time of 30 minutes, 3 parts of a synthetic fat-liquoring agent (formulation based on sulfonated aliphatic hydrocarbons, fatty acids and derivatives thereof) are added, and after a further 30 minutes, 1 part of 85% formic acid is added. After the acidification, the treatment is continued at 50° C. for a further 30 minutes. The leather is then rinsed in cold water and finished.

The resulting dried leather which has been dyed brown is then sprayed twice crosswise (twice with about 75 ml/m²) with the finish described in Example 5 and is then dried and finished in the customary manner. The resulting level brown dyeing has distinctly improved fastness properties, in particular fastness to light and rubbing, compared with a dyeing of the same depth of shade without after-treatment with sterically hindered amine, UV absorber and antioxidant.

EXAMPLE 7

100 parts of chrome-tanned cowhide (shaved weight) are washed in 300 parts of water at 30° C. for 15 minutes and then neutralized for 60 minutes at 30° C. in a liquor comprising 300 parts of water, 2 parts of neutralizing agent (Na salts of aromatic sulfonic acids and aliphatic dicarboxylic acids) and 0.5 part of sodium bicarbonate. A washing operation in 300 parts of water at room temperature lasting 15 minutes then follows.

The leather treated in this way is now dyed at 50° C. for 30 minutes in a freshly prepared liquor of 300 parts of water and 0.734 part of the dye mixture comprising 0.477 part of the yellow dye of the formula

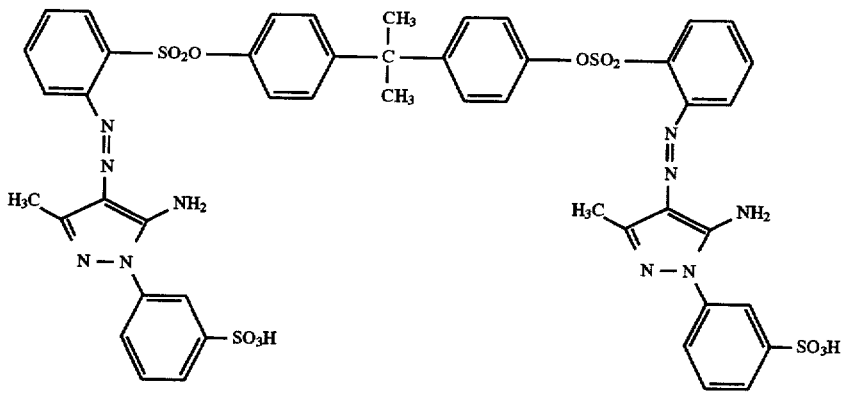

0.077 part of the blue dye of the formula

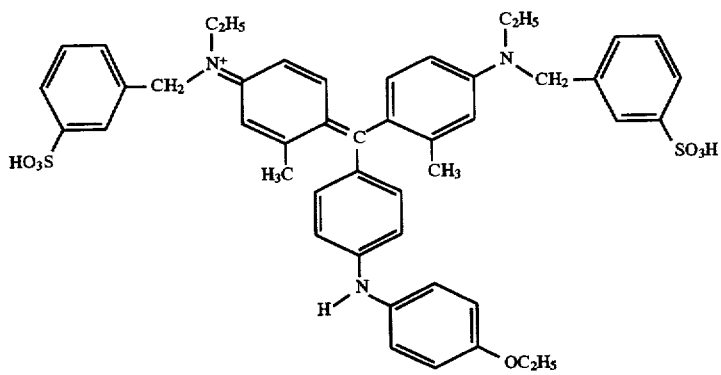

and 0.180 part of the red dye of the formula

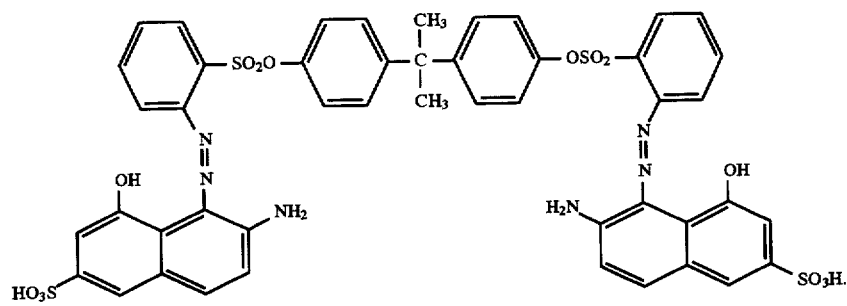

3 parts of a synthetic fat-liquoring agent (formulation based on sulfonated aliphatic hydrocarbons, fatty acids and derivatives thereof) are then added to the dye liquor, and after a further 30 minutes, 0.5 part of 85% formic acid is added. Dyeing is continued at an unchanged temperature for a further 30 minutes and, after rinsing, the dyed leather is finished in the customary manner.

The finish described in Example 5 is then applied twice by means of a screen roller to the resulting dried leather which has been dyed medium-brown (liquor pick-up about 150 ml/m²), and the leather is then dried and finished in the customary manner. The resulting level brown dyeing has distinctly improved fastness properties, in particular fastness to light and rubbing, compared with a dyeing of the same depth of shade without after-treatment with the sterically hindered amine, UV absorber and antioxidant.

EXAMPLE 8

100 parts of undyed, retanned, white, dried leather is sprayed twice crosswise (twice with about 100 ml/m²) with a finish comprising 75 parts of the physical form, described in Example 1, of the sterically hindered amine, 75 parts of the physical form, described in Example 3, of the antioxidant and 850 parts of water and are then dried and finished in the customary manner. The resulting leather has a distinctly improved fastness to light compared with untreated leather and also shows considerably less yellowing during prolonged storage under natural light.

EXAMPLE 9

100 parts of chrome-tanned clothing suede leather (dry weight) are drummed at 50° C. for 60 minutes in a solution of 1000 parts of water and 2 parts of 24% ammonia. A washing process of 15 minutes duration in 1000 parts of water of 50° C. then follows.

After these preparatory operations, the leather is dyed at 50° C. in a liquor comprising 1000 parts of water, 2 parts of 24% ammonia and 13 parts of a liquid physical form comprising 15% of the dye of the formula

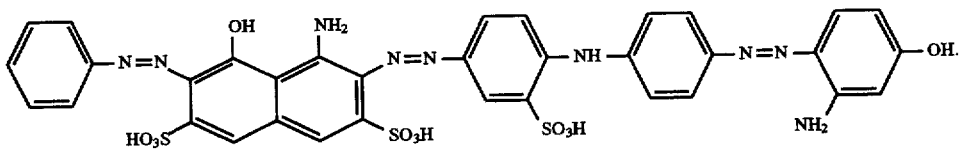

After a dyeing time of 60 minutes, the bath is acidified with 4 parts of a 85% formic acid and dyeing is then continued for a further 20 minutes.

After treatment in a fresh bath with 1000 parts of water, 2.5 parts of a condensation product of formaldehyde, dicyandiamide, ammonium chloride and ethylenediamine and 0.5 part of 85% formic acid at 50° C. for 45 minutes, the dyed leather is finished. The resulting leather is dyed black.

The dried leather is then sprayed crosswise twice (twice with about 75 ml/m²) with a finish comprising 100 parts of the physical form, described in Example 1, of the sterically hindered amine, 100 parts of the physical form, described in Example 2, of the UV absorber and 800 parts of water, and is then dried and finished in the customary manner. The resulting level black dyeing has distinctly improved fastness properties, in particular fastness to light and rubbing, compared with a dyeing of the same depth of shade without aftertreatment with the sterically hindered amine and UV absorber.

EXAMPLE 10

Leather which has been dyed in accordance with the instructions in the first two sections of Example 6 is used. A finish comprising 70 parts of the physical form, described in Example 1, of the sterically hindered amine, 50 parts of the physical form, described in Example 2, of the UV absorber, 30 parts of the physical form, described in Example 3, of the antioxidant, 5 parts of a commercially available alginate thickener and 845 parts of water, is then applied by means of a screen roller to the resulting dried leather which has been dyed brown (liquor pick-up about 200 ml/m$^2$), and the leather is then dried and finished in the customary manner. The resulting level brown dyeing has distinctly improved fastness properties, in particular fastness to light and rubbing, compared with a dyeing of the same depth of shade without aftertreatment with the sterically hindered amine, UV absorber and antioxidant.

EXAMPLE 11

A liquid physical form of the following composition is prepared by mixing the components at room temperature:

90% of the sterically hindered amine 1-benzyl-4-hydroxy-2,2,6,6-tetramethylpiperidine, 5% of sorbitan monooleate and 5% of the reaction product of about 20 mol of ethylene oxide and 1 mol of sorbitan monooleate.

The resulting physical form has a long shelf life and can be emulsified very easily in water.

EXAMPLE 12

A liquid physical form of the following composition is prepared by mixing the components at room temperature:

90% of the sterically hindered amine 1,2,2,6,6-pentamethylpiperidin-4-yl β-(3,5-di-tert-butyl-4-hydroxyphenyl)-propionate, 5% of sorbitan monooleate and 5 % of the reaction product of about 20 mol of ethylene oxide and 1 mol of sorbitan monooleate.

The resulting physical form is stable on storage and can be emulsified very easily in water.

EXAMPLE 13

A liquid physical form of the following composition is prepared by mixing the components at room temperature:

90% of the sterically hindered amine di-(2,2,6,6-tetramethylpiperidin-4-yl)-sebacate, 5% of sorbitan monooleate and 5% of the reaction product of about 20 mol of ethylene oxide and 1 mol of sorbitan monooleate.

The resulting physical form has a long shelf life and can be emulsified very easily in water.

EXAMPLE 14

A liquid physical form of the following composition is prepared by mixing the components at room temperature:

90% of the sterically hindered amine of the formula

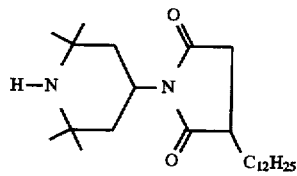

5% of sorbitan monooleate and

5% of the reaction product of about 20 mol of ethylene oxide and 1 mol of sorbitan monooleate.

The resulting physical form has a long shelf life and can be emulsified very easily in water.

EXAMPLE 15

A liquid physical form of the following composition is prepared by mixing the components at room temperature:

90% of the sterically hindered amine of the formula

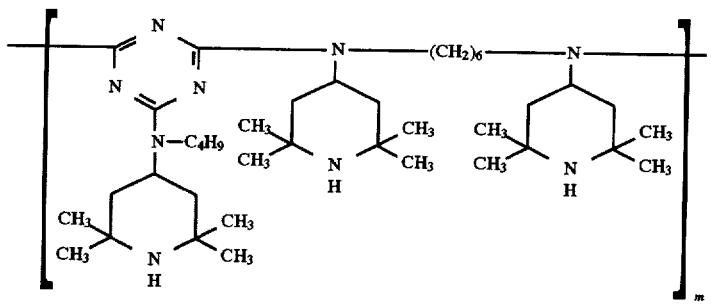

5% of sorbitan monooleate and

5% of the reaction product of about 20 mol of ethylene oxide and 1 mol of sorbitan monooleate.

The resulting physical form has a long shelf life and can be emulsified very easily in water.

EXAMPLES 16 to 20

The procedure described in Example 5 is repeated, except that instead of 80 parts of the physical form, described in Example 1, of the sterically hindered amine, the same amount of the physical form described in Example 11, 12, 13, 14 or 15 is used.

Aqueous finishes for the treatment of leather which are employed as described in Examples 6 and 7 are obtained.

EXAMPLE 21

A liquid physical form of the following composition is prepared by mixing the components at room temperature:

90% of the transesterification product of 2-[3'-tert-butyl-5'-(2-methoxycarbonylethyl)-2'-hydroxy-phenyl]-benzotriazole with polyethylene glycol 300 (UV absorber), 3% of sorbitan monooleate and 7% of the reaction product of about 20 mol of ethylene oxide and 1 mol of sorbitan monooleate.

The resulting physical form has a long shelf life and can be emulsified very easily in water.

EXAMPLE 22

A liquid physical form of the following composition is prepared by mixing the components at room temperature:

90% of the UV absorber of the formula R—$CH_2$—$CH_2$—COO—$(CH_2)_6$—OOC—$CH_2$—$CH_2$—R, in which R is 3'-tert-butyl-4'-hydroxy-5'-2H-benzotriazol-2-yl-phenyl, 3% of sorbitan monooleate and 7% of the reaction product of about 20 mol of ethylene oxide and 1 mol of sorbitan monooleate.

EXAMPLES 23 and 24

The procedure described in Example 5 is repeated, except that instead of 70 parts of the physical form, described in Example 2, of the UV absorber, the same amount of the physical form described in Example 21 or 22 is used.

Aqueous finishes for the treatment of leather, which are employed as described in Examples 6 and 7 are obtained.

The resulting physical form has a long shelf life and can be emulsified very easily in water.

EXAMPLE 25

The procedure described in Examples 1, 2, 3, 4, 11 to 15, 21 and 22 is repeated, except that instead of 5% of sorbitan monooleate, the same amount of one of the following compounds is used:

sorbitan sesquistearate,
glycerol monostearate,
propylene glycol monomyristate,
decaglycerol pentaoleate,
diethylene glycol monooleate,
sorbitan sesquioleate,
sorbitan trioleate.

Storage-stable physical forms which can be dispersed very easily in water and can be used in the same manner as described in Examples 5, 6 and 7 are obtained.

EXAMPLE 26

The procedure described in Examples 1, 2, 3, 4, 11 to 15, 21 and 22 is repeated, except that instead of the 5% of the reaction product of about 20 mol of ethylene oxide and 1 mol of sorbitan monooleate, the same amount of one of the following compounds is used:

reaction product of about 20 mol of ethylene oxide and 1 mol of sorbitan monostearate, reaction product of about 15 mol of ethylene oxide and 1 mol of nonylphenol, reaction product of about 20 mol of ethylene oxide and 1 mol of sorbitan monoisostearate, polyethylene glycol 600-monolaurate or reaction product of about 60 mol of ethylene oxide and 1 mol of sorbitol tetraoleate.

Storage-stable physical forms which can be dispersed very easily in water and can be used in the same manner as described in Examples 5, 6 and 7 are obtained.

EXAMPLE 27

An aqueous finish of the following composition is prepared by mixing the components at room temperature:

70 parts of the sterically hindered amine from Example 1, 70 parts of the UV absorber from Example 2, 30 parts of the antioxidant from Example 3, 200 parks of perfluorooctyl iodide and 630 parts of water.

This finish is applied to leather as described in Examples 6 to 10, instead of the finishes used in those examples, and the leather is then dried and finished.

Leather which has the properties described in these examples and additionally is water-repellent is obtained.

What is claimed is:

1. A composition for improving the resistance of leather and imitation leather to the influence of light and/or heat, which comprises a) an amount, which is effective to improve the resistance of said leather and imitation leather to the influence of light and/or heat of at least one of a water-insoluble sterically hindered amine, a water insoluble UV absorber or a water-insoluble antioxidant, b) a polyalcohol which is completely or partly esterified with a fatty acid, c) a reaction product of a polyalcohol, which is completely or partly esterified with a fatty acid, an alkylene oxide and, optionally, d) water and/or a stabilizer, diluent, fat-liquoring agent, agent which influences handle, acrylic resin, polyurethane, flame-proofing agent, emulsion carrier and/or hydrophobizing agent, with the proviso that components b) and c) are present in an amount which is effective to emulsify component a).

2. A composition according to claim 1, which comprises a water-insoluble sterically hindered amine.

3. A composition according to claim 1, which comprises a water-insoluble UV absorber.

4. A composition according to claim 1, which comprises a water-insoluble antioxidant.

5. A composition according to claim 2, which comprises, as the sterically hindered amine, a compound which contains at least one group of the formula I

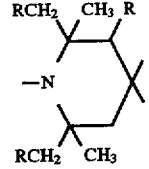

in which R is hydrogen or methyl.

6. A composition according to claim 5, which comprises a sterically hindered amine of the formula II

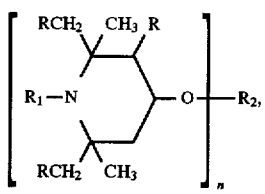

in which n is a number from 1 to 4,

R is hydrogen or methyl, $R_1$ is hydrogen, hydroxyl, $C_1$-$C_{12}$alkyl, $C_3$-$C_8$alkenyl, $C_3$-$C_8$alkynyl, $C_7$-$C_{12}$aralkyl, $C_1$-$C_8$alkanyl, $C_3$-$C_5$alkenoyl, glycidyl, —O—$C_1$-$C_{12}$alkyl, —O—$C_1$-$C_8$alkanoyl or a group —$CH_2CH(OH)$—Z, in which Z is hydrogen, methyl or phenyl, $R_2$, if n is 1, is hydrogen, $C_1$-$C_{18}$alkyl, which may be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid, or a monovalent silyl radical, and in which $R_2$, if n is 2, is $C_1$-$C_{12}$alkylene, $C_4$-$C_{12}$alkenylene, xylylene, a divalent radical of an aliphatic, cycloaliphatic, araliphatic or aromatic dicarboxylic acid, dicarbamic acid or phosphorus- containing acid or a divalent silyl radical, or, if n is 3, is a trivalent radical of an aliphatic, cycloaliphatic or aromatic tricarboxylic acid, of an aromatic tricarbamic acid or of a phosphorus-containing acid or a trivalent silyl radical, or, if n is 4, is a tetravalent radical of an aliphatic, cycloaliphatic or aromatic tetracarboxylic acid.

7. A composition according to claim 6, which comprises a sterically hindered amine of the formula II in which n is 1 or 2, R is hydrogen or methyl, $R_1$ is hydrogen, $C_1$-$C_4$alkyl, allyl, benzyl, acetyl or acryloyl and $R_2$, if n is 1, is a radical of an aliphatic carboxylic acid having 2 to 18 C atoms, of a cycloaliphatic carboxylic acid having 7 to 15 C atoms, of an α,β-unsaturated carboxylic acid having 3 to 5 C atoms or of an aromatic carboxylic acid having 7 to 15 C atoms, and, if n is 2, is a radical of an aliphatic dicarboxylic acid having 2 to 36 C atoms, of a cycloaliphatic or aromatic dicarboxylic acid having 8 to 14 C atoms or of an aliphatic, cycloaliphatic or aromatic dicarbamic acid having 8 to 14 C atoms.

8. A composition according to claim 5, which comprises a sterically hindered amine of the Formula (III)

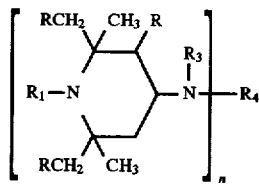

in which n is the number 1 or 2,

R is hydrogen or methyl, $R_1$ is hydrogen, hydroxyl, $C_1$-$C_{12}$alkyl, $C_3$-$C_8$alkenyl, $C_3$-$C_8$alkynyl, $C_7$-$C_{12}$aralkyl, $C_1$-$C_8$alkanoyl, $C_3$-$C_5$alkanoyl, glycidyl, —O—$C_1$-$C_{12}$alkyl, —O—$C_1$-$C_8$alkanoyl or a group —$CH_2CH(OH)$—Z, in which Z is hydrogen, methyl or phenyl, $R_3$ is hydrogen, $C_1$-$C_{12}$alkyl, $C_2$-$C_5$hydroxyalkyl, $C_5$-$C_7$cycloalkyl, $C_7$-$C_8$aralkyl, $C_2$-$C_{18}$alkanoyl, $C_3$-$C_5$alkenoyl or benzoyl and $R_4$, if n is 1, is hydrogen, $C_1$-$C_{18}$alkyl, $C_3$-$C_8$alkenyl, $C_5$-$C_7$cycloalkyl, $C_1$-$C_4$alkyl substituted by a hydroxyl, cyano, alkoxycarbonyl or carbamide group, glycidyl, or a group of the formula —$CH_2$—$CH(OH)$—Z or of the formula —$CONH$—Z, in which Z is hydrogen, methyl or phenyl;

or, if n is 2, is $C_2$-$C_{12}$alkylene, $C_6$-$C_{12}$arylene, xylylene, a —$CH_2$—$CH(OH)$—$CH_2$— group or a group —$CH_2$—$CH(OH)$—$CH_2$—O—D—O—, in which D is $C_2$-$C_{10}$alkylene, $C_6$-$C_{15}$arylene or $C_6$-$C_{12}$cycloalkylene, or, provided that $R_3$ is not alkanoyl, alkenoyl or benzoyl, $R_4$ can also be a divalent radical of an aliphatic, cycloaliphatic or aromatic dicarboxylic acid or dicarbamic acid or also the group —CO—, or $R_3$ and $R_4$ together, if n is 1, can be the divalent radical of an aliphatic, cycloaliphatic or aromatic 1,2- or 1,3-dicarboxylic acid.

9. A composition according to claim 5, which comprises a statically hindered amine of the formula (IV)

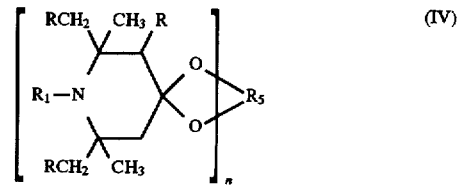

in which n is the number 1 or 2,

R is hydrogen or methyl, $R_1$ is hydrogen, hydroxyl, $C_1$-$C_{12}$alkyl, $C_3$-$C_8$alkenyl, $C_3$-$C_8$alkynyl, $C_7$-$C_{12}$aralkyl, $C_1$-$C_8$alkanoyl, $C_3$-$C_5$alkenoyl, glycidyl, —O—$C_1$-$C_{12}$alkyl, —O—$C_1$-$C_8$alkanoyl or a group —$CH_2CH(OH)$—Z, in which Z is hydrogen, methyl or phenyl, $R_5$, if n is 1, is $C_2$-$C_8$alkylene or -hydroxyalkylene or $C_4$-$C_{22}$acyloxyalkylene, or, if n is 2, is the group (—$CH_2$)$_2$C($CH_2$—)$_2$.

10. A composition according to claim 5, which comprises a sterically hindered amine of the formula (VA), (VB) or (VC)

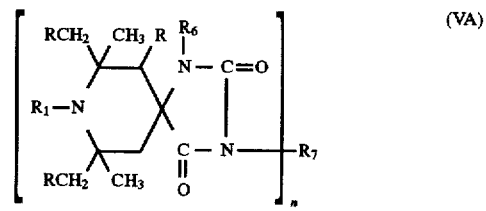

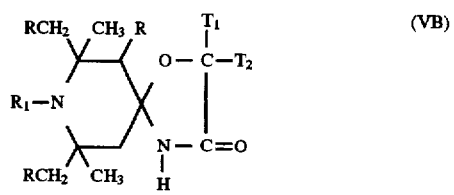

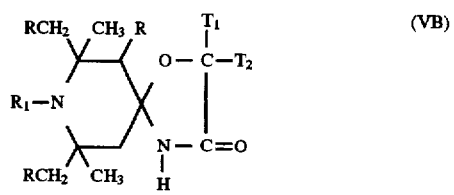

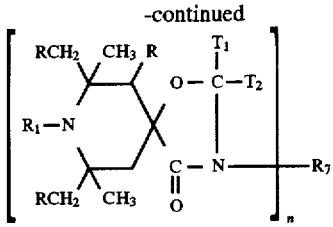

in which n is the number 1 or 2,

R is hydrogen or methyl, $R_1$ is hydrogen, hydroxyl, $C_1$-$C_{12}$alkyl, $C_3$-$C_8$alkenyl, $C_3$-$C_8$alkynyl, $C_7$-$C_{12}$aralkyl, $C_1$-$C_8$alkanoyl, $C_3$-$C_5$alkenoyl, glycidyl, —O—$C_1$-$C_{12}$alkyl, —O—$C_1$-$C_8$alkanoyl or a group —$CH_2CH(OH)$—Z, in which Z is hydrogen, methyl or phenyl, $R_6$ is hydrogen, $C_1$-$C_{12}$alkyl, allyl, benzyl, glycidyl or $C_2$-$C_6$alkoxyalkyl and $R_7$, if n is 1, is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or a group of the formula —$(CH_2)_p$—COO—Q or of the formula —$(CH_2)_p$—O—CO—Q, in which p is 1 or 2 and Q is $C_1$-$C_4$alkyl or phenyl, or, if n is 2, is $C_2$-$C_{12}$alkylene, $C_4$-$C_{12}$alkenylene, $C_6$-$C_{12}$arylene, a group —$CH_2$—$CH(OH)$—$CH_2$—O—D—O—$CH_2$—$CH(OH)$—$CH_2$—, in which D is $C_2$-$C_{10}$alkylene, $C_6$-$C_{15}$arylene, $C_6$-$C_{12}$cycloalkylene, or a group —$CH_2CH(OZ')CH_2$—$(OCH_2$—$CH(OZ')$ $CH_2)_2$—, in which Z' is hydrogen, $C_1$-$C_{18}$alkyl, allyl, benzyl, $C_2$-$C_{12}$alkanoyl or benzoyl, $T_1$ and $T_2$ independently of one another are hydrogen, $C_1$-$C_{18}$alkyl, $C_6$-$C_{10}$aryl or $C_7$-$C_9$aralkyl which are unsubstituted or substituted by halogen or $C_1$-$C_4$alkyl, or $T_1$ and $T_2$, together with the C atom joining them, form a $C_5$-$C_{12}$cycloalkane ring.

11. A composition according to claim 5, which comprises a sterically hindered amine of the formula (VI)

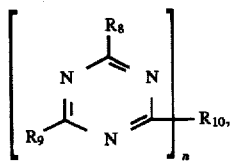

in which n is the number 1 or 2 and $R_8$ is a group of the formula

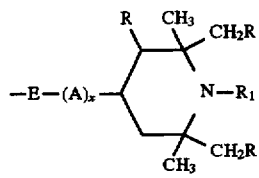

in which

R is hydrogen or methyl, $R_1$ is hydrogen, hydroxyl, $C_1$-$C_{12}$alkyl, $C_3$-$C_8$alkenyl, $C_3$-$C_8$alkynyl, $C_7$-$C_{12}$aralkyl, $C_1$-$C_8$alkanoyl, $C_3$-$C_5$alkenoyl, glycidyl, —O—$C_1$-$C_{12}$alkyl, —O—$C_1$-$C_8$alkanoyl or a group —$CH_2CH(OH)$—Z, in which Z is hydrogen, methyl or phenyl, E is —O— or —$NR_{11}$—, A is $C_2$-$C_6$alkylene or —$(CH_2)_3$—O— and x is the number 0 or 1, $R_9$ is the same as $R_8$ or is one of the groups —$NR_{11}R_{12}$, —$OR_{13}$, —$NHCH_2OR_{13}$ or —$N(CH_2OR_{13})_2$, $R_{10}$, if n is 1, is the same as $R_8$ or $R_9$, or, if n is 2, is a group —E—B—E—, in which B is $C_2$-$C_6$alkylene, which may be interrupted by —$N(R_{11})$—, $R_{11}$ is $C_1$-$C_{12}$alkyl, cyclohexyl, benzyl or $C_1$-$C_4$hydroxyalkyl, or a group of the formula

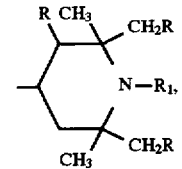

$R_{12}$ is $C_1$-$C_{12}$alkyl, cyclohexyl, benzyl or $C_1$-$C_4$hydroxyalkyl and $R_{13}$ is hydrogen, $C_1$-$C_{12}$alkyl or phenyl, or $R_{11}$ and $R_{12}$ together are $C_4$-$C_5$alkylene, $C_4$-$C_5$oxaalkylene or a group of the formula

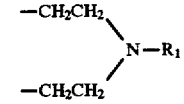

or $R_{11}$ and $R_{12}$ are also each a group of the formula

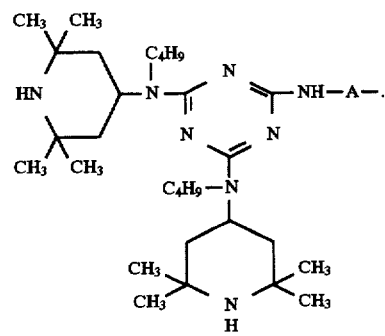

12. A composition according to claim 5, which comprises, as the sterically hindered amine, an oligomeric or polymeric compound, having a recurring structural unit which contains a 2,2,6,6-tetraalkylpiperidine radical of the formula (I).

13. A composition according to claim 3, which comprises, as the UV absorber, a 2-(2'-hydroxyphenyl)-benzotriazole, a 2-hydroxybenzophenone, an ester of a substituted or unsubstituted benzoic acid or a 2-(2-hydroxyphenyl)-1,3,5-triazine.

14. A composition according to claim 13, which comprises, as the UV absorber, 2-(2'-hydroxy-5'-methylphenyl)-benzotriazole, 2-(3',5'-di-tert-butyl-2'-hydroxyphenyl)-benzotriazole, 2-(5'-tertbutyl-2'-hydroxyphenyl)-benzotriazole, 2-(2'-hydroxy-5'- (1,1,3,3-tetramethylbutyl)phenyl)-benzotriazole, 2-(3',5'-di-tert-butyl-2'-hydroxyphenyl)-5-chloro-benzotriazole, 2-(3'-tert-butyl- 2'-hydroxy-5'-methylphenyl)-5-chloro-benzotriazole, 2-(3'-sec-butyl-5'-tert-butyl-2'-hydroxyphenyl)-benzotriazole, 2-(2'-hydroxy-4'-octoxyphenyl)-benzotriazole, 2-(3',5'-di-tert-amyl-2'-hydroxyphenyl)-benzotriazole, 2-(3',5'-bis-(α,α-dimethylbenzyl)-2'-hydroxyphenyl)-benzotriazole, mixture of 2-(3'-tert-butyl-2'-hydroxy-5'-(2-octyloxycarbonylethyl)phenyl)-5-chloro-benzotriazole, 2-(3'-tertbutyl-5'-[2-(2-ethylhexyloxy)-carbonylethyl]-2'-hydroxyphenyl)-5-chloro-benzotriazole, 2-(3'-tertbutyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, 2-(3'-tert-butyl-2'-hydroxy-5'-(2-isooctyloxycarbonylethyl) phenyl-benzotriazole, and 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxy-phenyl]-benzotriazole with polyethylene glycol 300; or [R—CH$_2$CH$_2$—COO (CH$_2$)$_3$]$_2$ in which R is 3'-tert-butyl-4'-hydroxy-5'-2H-benzotriazol-2-yl-phenyl.

15. A composition according to claim 4, which comprises, as the UV absorber, 2-(3'-dodecyl-2'-hydroxy-5'-methylphenyl)-benzotriazole.

16. A composition according to claim 14, which comprises, as the antioxidant a compound selected from the group consisting of: alkylated monophenols, alkylthiomethylphenols, hydroquinones and alkylated hydroquinones, hydroxylated thiodiphenyl ethers, alkylidene-bisphenols, O—, N— and S-benzyl compounds, hydroxybenzylated malonates, hydroxybenzyl aromatics, triazine compounds, benzylphosphonates, acylaminophenols, esters of β-(3,5-di-tert-butyl-4-hydroxyphenyl)-propionic acid, of β-(5-tert-butyl-4-hydroxy-3-methylphenyl)-propionic acid, of β-(3,5-dicyclohexyl-4-hydroxyphenyl)-propionic acid or of 3,5-di-tert-butyl-4-hydroxyphenylacetic acid with mono- or polyhydric alcohols and amides of β-(3,5-di-tert-butyl-4-hydroxyphenyl)-propionic acid.

17. A composition according to claim 16, which comprises, as the antioxidant, an ester of β(3,5-di-tert-butyl-4-hydroxyphenyl)-propionic acid with a mono- or polyhydric alcohol selected from the group consisting of methanol, ethanol, octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris-(hydroxyethyl)isocyanurate, N,N'-bis-(hydroxyethyl)-oxalic acid diamide, 3-thiaundecanol, 3-thiapentadecanol, trimethylhexanediol, trimethylolpropane and 4-hydroxymethyl-1-phospha-2,6,7-trioxabicyclo-[2.2.2]-octane.

18. A composition according to claim 17, which comprises, as the antioxidant, β-(3,5-di-tert-butyl-4-hydroxyphenyl)-propionic acid which has been esterified with octanol.

19. A composition according to claim 1, which comprises a mixture of b) a polyalcohol which is completely or partially esterified with a fatty acid and c) a reaction product of a polyalcohol, which is completely or partly esterified with a fatty acid, and an alkylene oxide, the polyalcohol being selected from the group consisting of diglycol, alkylene or dialkylene glycols, sorbitan, sorbitol, mannitol, xylitol, pentaerythritol, diglycerol, glycerol and glycerolsorbitol.

20. A composition according to claim 19, which comprises a mixture of b) a polyalcohol which is completely or partly esterified with a fatty acid and c) a reaction product of a polyalcohol, which is completely or partly esterified with a fatty acid, and an alkylene oxide, the fatty acid being selected from the group consisting of caprylic, capric, lauric, myristic, palmitic, stearic, arachic, behenic, coconut fat-(C$_8$–C$_{18}$), decenoic, dodecenoic, tetradecenoic, hexadecenoic, oleic, linoleic, linolenic, eicosenoic, docosenoic and clupanodonic acid.

21. A composition according to claim 20, which comprises, as the polyalcohol which is completely or partly esterified with a fatty acid, sorbitan, sorbitol, mannitol, xylitol or pentaerythritol which is esterified with 1 to 3 mol of lauric, palmitic, stearic, oleic, linoleic or linolenic acid.

22. A composition according to claim 1, which comprises, as the alkylene oxide, ethylene oxide.

23. A composition according to claim 22, which comprises a reaction product of sorbitan esterified with 1 to 3 moles of oleic acid with 5 to 40 moles of ethylene oxide.

24. A composition according to claim 2, which comprises a) 75 to 95% by weight of a water-insoluble sterically hindered amine and b) 25 to 5% by weight of a mixture of b1) a polyalcohol which is completely or partly esterified with a fatty acid and b2) a reaction product of a polyalcohol, which is completely or partly esterified with a fatty acid, and an alkylene oxide, the ratio of components b1):b2) being between 3:7 and 7:3.

25. A composition according to claim 3, which comprises a) 75 to 95% by weight of a water-insoluble UV absorber and b) 25 to 5% by weight of a mixture of b1) a polyalcohol which is completely or partly esterified with a fatty acid and b2) a reaction product of a polyalcohol, which is completely or partly esterified with a fatty acid, and an alkylene oxide, the ratio of components b1):b2) being between 9:1 and 5:5.

26. A composition according to claim 4, which comprises a) 75 to 95% by weight of a water-insoluble antioxidant and b) 25 to 5% by weight of a mixture of b1) a polyalcohol which is completely or partly esterified with a fatty acid and b2) a reaction product of a polyalcohol, which is completely or partly esterified with a fatty acid, and an alkylene oxide, the ratio of components b1):b2) being between 1:9 and 5:5.

27. A process for improving the light stability of leather, which comprises applying a composition according to claim 2 to the leather.

28. A process for improving the resistance of a leather or imitation leather substrate to the influence of light or heat or both, which comprises treating said substrate with an aqueous liquor consisting essentially of water, an amount which is effective to emulsify the below-specified combination of components a), b) and c) of an emulsifier or dispersant and an amount which is effective to improve the resistance of said leather or imitation leather to the influence of light and/or heat of a) a water-insoluble sterically hindered amine and, b) a water-insoluble UV absorber or c) a water-insoluble antioxidant, or a) plus both of b) and c).

29. A process according to claim 28 which comprises an emulsifier.

30. The leather or imitation leather treated with a process according to claim 28.

31. An aqueous liquor for improving the resistance of a leather or imitation leather substrate to the influence of light or heat or both, which aqueous liquor consists essentially of water, an amount which is effective to emulsify the below-specified combination of components a), b) and c) of an emulsifier or dispersant and an amount which is effective to improve the resistance of the leather or imitation leather to the influence of light and/or heat of a) a water-insoluble sterically hindered amine and, b) a water-insoluble UV absorber or c) a water-insoluble antioxidant, or a) plus both of b) and c).

32. An aqueous liquor according to claim 31 which comprises an emulsifier.

* * * * *